United States Patent [19]

Shuler

[11] Patent Number: 5,734,202

[45] Date of Patent: Mar. 31, 1998

[54] METHOD AND APPARATUS FOR GENERATING ELECTRICITY UTILIZING A FORCED RECIRCULATING AIR TUNNEL

[76] Inventor: Melvin B. Shuler, 617 Clebud Dr., Euless, Tex. 76040

[21] Appl. No.: 508,310

[22] Filed: Jul. 27, 1995

[51] Int. Cl.$^6$ ............................................. F03D 9/00
[52] U.S. Cl. ......................................... 290/55; 290/1 R
[58] Field of Search ............................. 290/44, 55, 1 R, 290/43, 54; 416/171, 177, 189, 176, 179, 200 R; 73/147; 415/909, 2.1

[56] References Cited

U.S. PATENT DOCUMENTS

| | | | |
|---|---|---|---|
| 1,571,303 | 2/1926 | Schafran | 290/1 R |
| 2,152,317 | 3/1939 | Kramer | 73/147 |
| 3,484,953 | 12/1969 | Norheim, Jr. | 73/147 |
| 3,927,329 | 12/1975 | Fawcett et al. | 290/1 R |
| 4,087,927 | 5/1978 | Basmajian | 434/389 |
| 4,114,046 | 9/1978 | Yousef | 290/55 |
| 4,159,426 | 6/1979 | Staton | 290/44 |
| 4,291,232 | 9/1981 | Cardone et al. | 290/1 R |
| 4,345,159 | 8/1982 | Gutierrez Atencio | 290/43 |
| 4,408,127 | 10/1983 | Santos, Sr. | 290/54 |
| 4,751,844 | 6/1988 | Matshushita | 73/147 |
| 4,770,031 | 9/1988 | Roth et al. | 73/147 |
| 4,779,006 | 10/1988 | Wortham | 290/55 |
| 4,916,382 | 4/1990 | Kent | 323/299 |
| 5,512,788 | 4/1996 | Berenda et al. | 290/55 |

*Primary Examiner*—Steven L. Stephan
*Assistant Examiner*—Christopher Cuneo
*Attorney, Agent, or Firm*—Melvin A. Hunn

[57] ABSTRACT

The present invention is directed to an apparatus for generating electricity, which includes a plurality of components which cooperate together. A housing is provided which defines a substantially enclosed and continuous, closed-loop airflow pathway. At least one power consuming air propeller is provided within the closed-loop airflow pathway for propelling air within the substantially enclosed and continuous closed-loop airflow pathway. A means is provided for energizing the at least one power consuming air propeller. Preferably, this means is an array of solar panels for generating electricity, but could alternatively comprise or include internal combustion engines, coal powered combustion engines, water powered turbines, or any conventional equivalent prime mover. Additionally, the apparatus includes a plurality of wind turbines located in the substantially enclosed and continuous closed-loop airflow pathway. Each of the wind turbines includes at least one propeller blade for engaging airflow within the substantially enclosed and continuous closed-loop airflow pathway, and a generator member for generating electricity in response to rotation of the at least one propeller blade.

22 Claims, 7 Drawing Sheets

METHOD AND APPARATUS FOR GENERATING ELECTRICITY UTILIZING A FORCED RECIRCULATING AIR TUNNEL

BACKGROUND OF THE INVENTION

1. Field of the Invention:

The present invention relates in general to systems which generate electricity, and in particular to systems which utilize wind turbines to generate electricity.

2. Description of the Prior Art:

Over the last two decades, the generation of electricity utilizing wind turbines has received considerable attention. Federal and state governments implemented a variety of financial incentives for the installation and operation of wind turbines in order to generate interest and development of non-fossil-fuel energy sources, particularly due to the Arab oil embargo which sent shock waves throught he economy of the United States of America. A variety of problems were found to exist in wind turbine electricity generators.

First, the quality and force of the wind is widely variable dependent upon geography, season, and weather. The turbines were found to be not all together economical for all regions in the country. Second, the wind turbine generators were designed and manufactured to accommodate a wide variety of wind velocities. These design and manufacturing concessions to the variability of the wind velocity necessarily results in a higher purchase cost for the wind turbine generators and in higher maintenance and upkeep costs associated with the turbines. Third, experience revealed that violent weather and particulate matter (such as dust) resulted in unavoidable maintenance costs for the wind generators. Fourth, safety concerns were raised regarding the operation of the wind turbines, resulting in the requirement that the turbines be placed very far from the ground to avoid injury to humans and in livestock. Even in high towers, the wind turbines presented a threat to wildlife such as migrating birds.

The need exists for new and improved uses of wind turbines which minimize the drawbacks associated with operating the generators.

SUMMARY OF THE INVENTION

It is one objective of the present invention to provide a method and apparatus for generating electricity utilizing a forced recirculation air tunnel, which allows wind turbines to be utilized in a manner which minimizes or eliminates the problems associated with normal operation of wind turbine generators, and in particular which eliminates or minimizes the high manufacturing costs, the high maintenance costs, and the safety considerations associated with the operation of wind turbines.

It is another objective of the present invention to provide a method and apparatus for generating electricity utilizing a forced recirculating air tunnel, which utilizes a substantially enclosed and continuous, closed-loop airflow pathway in combination with an air propeller and a plurality of wind turbines located within the airflow pathway in order to generate electricity from a substantially constant velocity wind flow within the airflow pathway which is utilized to rotate propeller blades associated with the generators which are positioned substantially transverse to the airflow pathway and completely enclosed within the airflow pathway.

These and other objectives are achieved as is now described. When characterized in apparatus, the present invention is directed to an apparatus for generating electricity, which includes a plurality of components which cooperate together. A housing is provided which defines a substantially enclosed and continuous, closed-loop airflow pathway. At least one power consuming air propeller is provided within the closed-loop airflow pathway for propelling air within the substantially enclosed and continuous closed-loop airflow pathway. A means is provided for energizing the at least one power consuming air propeller. Preferably, this means is an array of solar panels for generating electricity, but could alternatively comprise or include internal combustion engines, coal powered combustion engines, water powered turbines, or any conventional equivalent prime mover. Additionally, the apparatus includes a plurality of wind turbines located in the substantially enclosed and continuous closed-loop airflow pathway. Each of the wind turbines includes at least one propeller blade for engaging airflow within the substantially enclosed and continuous closed-loop airflow pathway, and a generator member for generating electricity in response to rotation of the at least one propeller blade.

Additional objectives, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

The present invention can be succinctly characterized as a forced recirculating air tunnel electrical system generator. In the present invention, the power of the wind is harnessed to create a constant and controlled duration of wind speed to turn multiple wind turbines by way of forced recirculating air in a wind tunnel built in a continuous round, oval, rectangle or elliptical shape. Each wind tunnel's diameter will vary to accommodate various diameters of rotating blades of multiple (several hundred) wind turbines within an enclosed and sealed tunnel.

The air is forced by way of a variable speed air propeller placed inline within the wind tunnel, thus pushing the air forward under pressure and at the same time pulling or causing a vacuum from the opposite direction. The velocity of the air in the wind tunnel is directly controlled by the air propeller's speed and the air temperature inside the wind tunnel, together with venturi tubes strategically placed or by gradually reducing he diameter of the wind tunnel at points downline in the tunnel. Controlled air density and temperature aid in compressing and controlling the speed of the air. Air speed or movement of air in the wind tunnel is generated by the variable speed propeller in relation to the number of wind turbines and the resistance of multiple wind turbines. The automatic compression of air will slightly raise the temperature of the recirculated air within the tunnel, causing expansion of air volume and aiding in the velocity or speed of the air. The air can be slightly cooled downline by mechanical means in the tunnel if desired, causing a decrease in air volume and aiding in the movement in the direction of airflow back to the propeller.

The power source for the air propeller will preferably be a solar powered electric motor, with a back-up electric motor or diesel engine in case of a prolonged overcast sky. If solar powered, the solar panels and storage can be placed in the center of the oval or elliptical tunnel. The back-up power source is also installed inline in the wind tunnel. All of the wind turbines and power source motors are installed on a horizontal rail. When the propellers or wind turbine blades are in a horizontal position, they may be removed through a porthole positioned around the horizontal rail leading to the outside of the tunnel. The tunnel would not lose air pressure with this method of replacing the air propeller and/or maintenance of each wind turbine.

The tunnel can be constructed of fiber glass, concrete, sheet metal steel or aluminum and insulated for noise and temperature control. Each wind turbine is controlled in the wind tunnel with blades that can be feathered to stop or start a given number of wind turbines as needed to produce electricity. The turbines can be removed and replaced through the maintenance porthole in the side of the tunnel thus avoiding a shutdown of the entire system as mentioned above. Several wind tunnels can be stacked in a multi-story fashion and/or a single family home by placing it in the attic or in the crawl space under the house. An even smaller model can be used to power an automobile with a slight variation in design. Thus, the wind tunnel of a "multi-story football field" is possible, with the wind tunnel diameters ranging from six inches to 100 feet.

One of the laws of wind power is that power of the wind is proportional to the cube of the wind speed. This means that a 12 mph wind has eight times the power of a six mph wind and a 24 mph has 64 times the power of a six mph wind. To put it another way, there is 73% more energy in a 12 mph wind that a 10 mph. It is the additional percentage that makes all the difference in a wind energy system. See Table 1 for numerical examples of rule number one.

The variable speed of the wind in different localities and in seasons of the year has been one of the limiting factors in wind system generators. Wind speed increases greatly with altitude; that is, the higher the tower, the better it is for energy gain and a turbulence-free operation. The cost factor of towers at least 60 feet high and the maintenance of the wind turbines at this height are real problems that must be dealt with on wind farms.

Again, the elements such as lightning and thunderstorms with 70 to 100 mph wind, not to mention tornados and hurricanes, can create havoc with wind turbines. In desert areas sand can take its toll on bearings and generator parts. Environmentalist are concerned about fossil fuel pollution and, perhaps a lesser problem, flocks of migrating birds flying into a wind farm area.

The present invention eliminates all of the above environmental problems and hazards to wind turbines and harnesses the velocity and duration of the wind at the desired sustained or constant and controlled air speed. Wind speeds and duration are actually controlled by the operator to increase or decrease velocity to get the desired wind power as mentioned above.

As explained earlier in rule number one: wind power goes up in relation to the cube of the wind speed. That is, double the wind speed and an eightfold increase in power is gained.

There is a second rule: double the diameter of the propeller and the power obtained is increased by a factor of four. See Table 2 for numerical examples of rule number two.

These two rules govern wind power, and they are only limited by a third rule, Betz's Law, which follows: energy is obtained from the wind by momentarily slowing down the speed of wind. The wind turbine never extracts all of he energy, otherwise the wind behind the turbine would come to a standstill.

Solidity ratios are also an important consideration: the solidity ratio is defined as the proportion in square feet of the area of sweep of the propeller to the solid square feet surface of the blades occupying the sweep of the propeller.

A high solidity would be the multi-blade propeller which is ideal for a wind speed of less than eight mph, such as a windmill propeller.

A low solidity would be a one-blade propeller with a counter-balance or a two-blade propeller. Modern airfoil propellers have been designed to create lift or a sail effect such as on an airplane wind, with practically no drag. This type of propeller has a smaller surface area in square feet in relation to the square feet of propeller sweep, therefore a very low solidity ration. They produce little or no power in wind speeds under eight mph; however, they make excellent use of high wind speeds which is the really useful power to in excess of 98% efficiency. With this type of propeller, the wind is slowed by less than five percent of its initial velocity as it passes through the propeller sweep then regains or recovers most of its initial speed immediately because of compression of the air and the lack of turbulence and drag behind the propeller. There is of course some friction on the wind tunnel walls which is overcome by compression, temperature and venturi tube placement.

There are two types of propellers to be used in the present invention. The first type described here is the airplane type of propeller, which produces a thrust of air from the positive side and at the same time pulls the return air from the negative side of the propeller.

The second type is a propeller that is pushed or turned by the wind, such as, for example, the old windmill propeller or the modern wind turbine propeller. The modern wind turbine propeller is pushed by the wind blade to give lift, while the opposite side of the propeller is tilted to slide or glide over the wind, also giving lift. This type of propeller has very little "DRAG" or air resistance and is considered to be a "high speed" propeller. The modern wind turbine propeller is designed under the same aerodynamic law that created the design for the airplane wing and operates best in 25 mph to 30 mph winds. This type of propeller will not operate in wind of eight mph or less.

Resistance or drag becomes a problem when the tip of a high speed propeller reaches the speed of sound. The following formula is used to discover and limit the tip speed:

$$\text{Tip speed ratio} = \frac{\text{Speed rotation of blade tip}}{\text{Wind Speed}}$$

$$\text{Tip Speed Ratio} = \frac{2(\pi)R\text{rpm}}{88V}$$

For example: A six-foot diameter propeller rotates at 700 rpm in a 23 mph wind, the tip speed ratio is 2×3.14×3×700/ 88×23 and equals 6.5. A tip speed ratio of 6.5 to 1 (6.5:1) means that in a 23 mph wind, the propeller tip travels at 150 mph. If the ratio were 1 to 1 (1:1) the propeller tip speed would be 23 mph. Modern airfoil propellers have a very low solidity ratio. They produce little or no power in wind speeds under eight mph, but they make excellent use of high wind speeds where the really useful power lies. Their high tip speed rotation makes them ideal for driving generators. The problem faced by the manufacturers of very large (80-foot-plus diameter) propellers is to design propellers capable of holding together in wind gusts while the tips are spinning at or exceeding the speed of sound.

Figure 1:
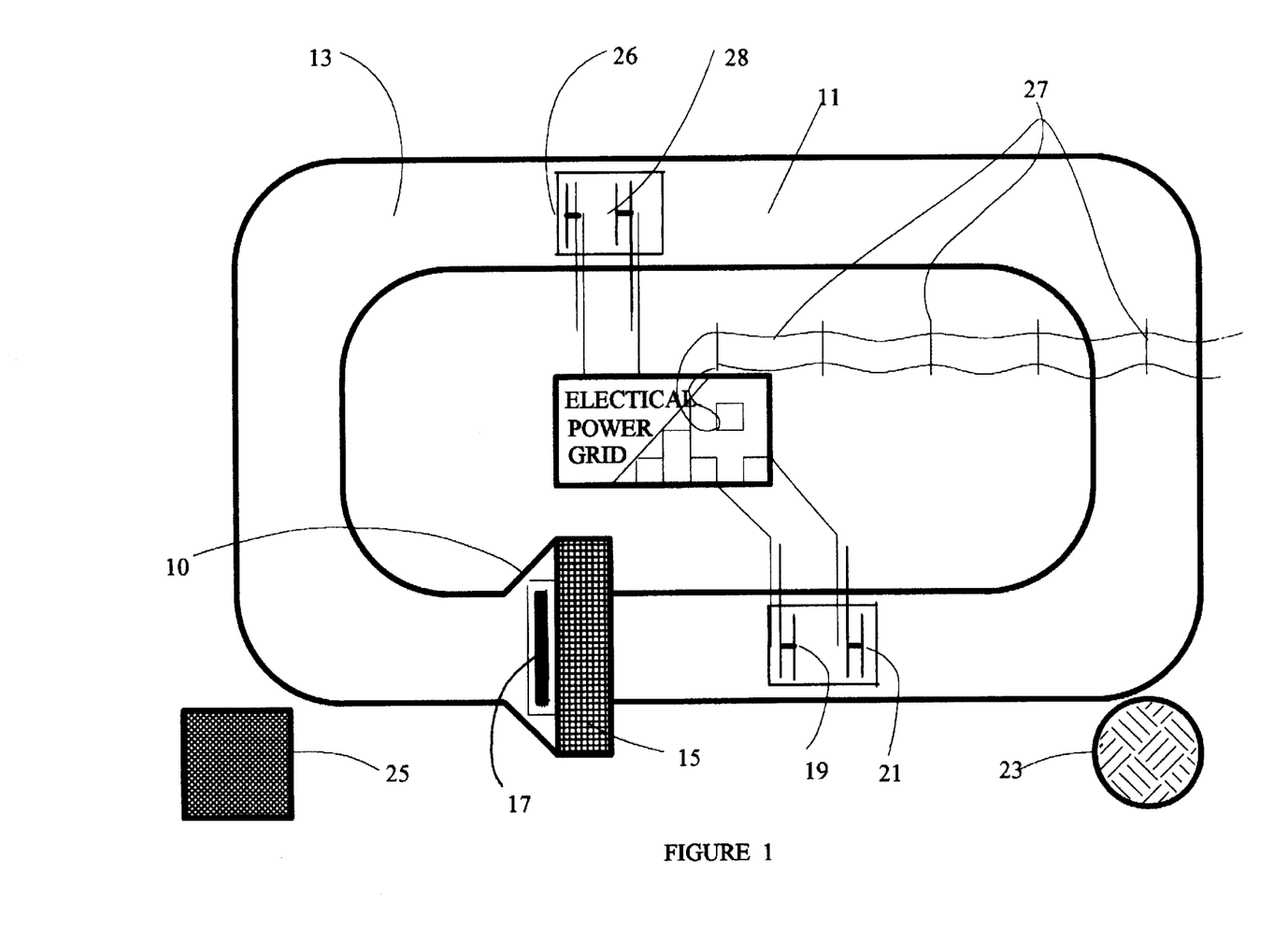
FIG. 1 is a perspective view of the improved apparatus for generating electricity utilizing a force recirculating air tunnel.

FIG. 1 is a perspective view of apparatus 11 for generating electricity utilizing a forced recirculating air tunnel. It includes a housing 13 which defines a substantially enclosed and continuous closed-loop airflow pathway. Preferably, the housing defines a sealed airflow pathway which allows for the pressurization of the air within the pathway to be maintained at a level substantially above the ambient air pressure external of the housing. While the housing 13 is depicted in substantially rectangular configuration in FIG. 1, it may alternatively be configured in circular, oval, or elliptical configurations. In fact, any configuration which defines a closed-loop may be utilized with the present invention. The housing 13 may also include reduced diameter portions (such as that identified as venturi tube 10) to increase the velocity of the airflow by increasing the pressure on the air. As is shown in FIG. 1, the apparatus 11 includes an array of solar panels 15 which are utilized to energize at least one power consuming air propeller which is positioned within the airflow pathway, and which is utilized to force the circulation of air in the closed-loop airflow pathway. In FIG. 1, the housing 17 for at least one power consuming air propeller is depicted. Alternative power sources may be provided including diesel or gasoline combustion engines, housed in auxiliary power housing 25, and which may be fueled with fuel from hydrocarbon fuel storage tank 23. Preferably, a plurality of wind turbines, such as wind turbines 19, 21 and 26, 28 are located throughout the closed-loop airflow pathway, and positioned transverse to the airflow path. Preferably, each of the plurality of wind turbines includes at least one propeller blade which engages the airflow pathway, and a generator member for generating electricity in response to rotation of the at least one propeller blade. The electrical energy developed by the individual wind turbines within the closed-loop airflow pathway is conditioned and fed into the electrical power grid utilizing transmission lines 27.

Figure 2:
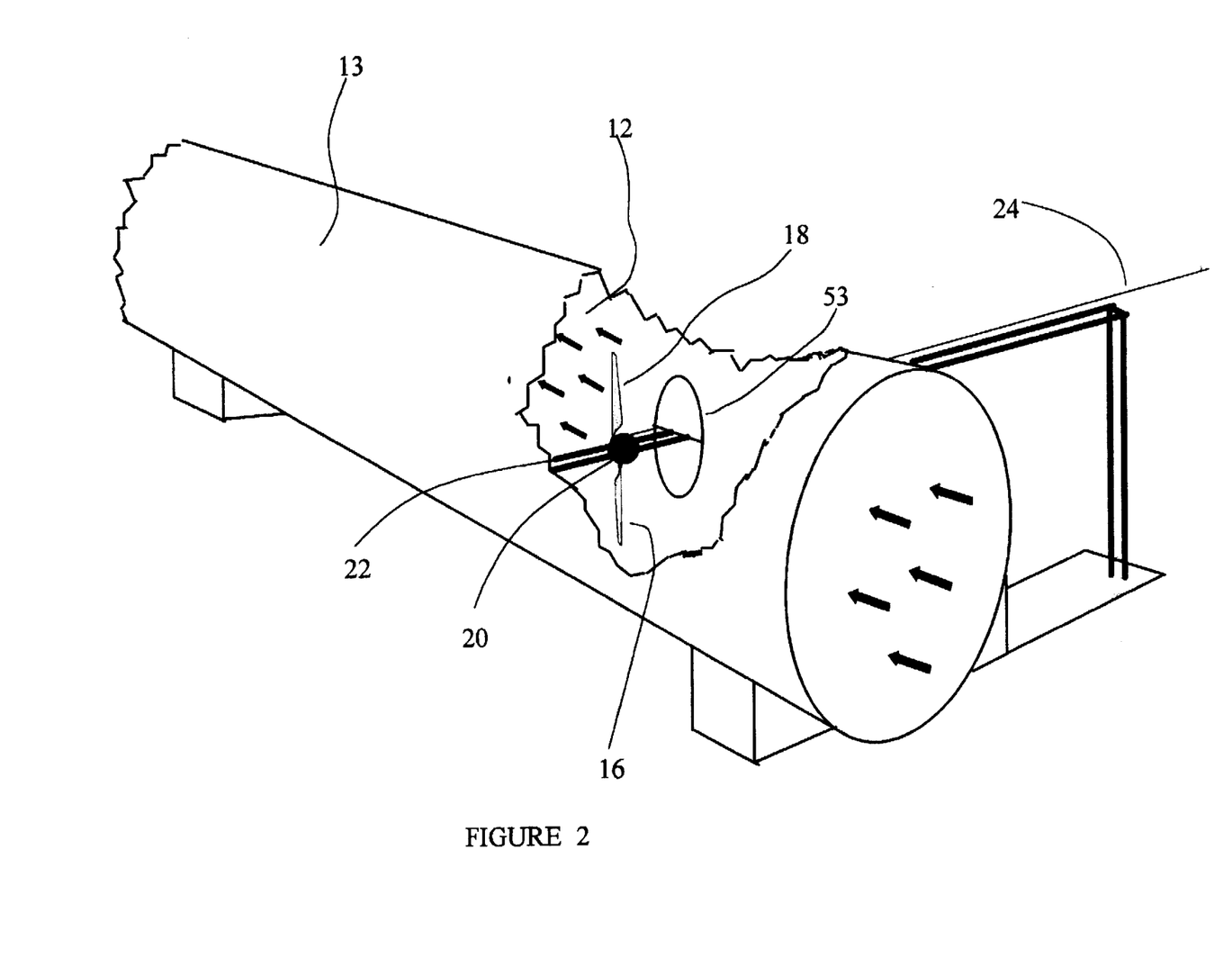
FIG. 2 is a fragmentary view of the generating apparatus.

FIG. 2 is a fragmentary view of housing 13 with air flow path 12 defined therethrough (with the flow of air represented by arrows). As is shown, wind turbine 16 is disposed in a central position within air flow path 12, and includes a stationary generator 20 and a movable propeller 18 connected thereto. The flow of air across propeller 18 causes propeller 18 to rotate, which causes generator 20 to generate electricity which is routed via electrical conductor 24 which is carried by service rail 22 which is utilized to hold wind turbine 16 in a fixed position within air flow pathway 12. As is shown, a porthole 53 is provided within housing 13, which is preferably circular in shape. The upper half of porthole 53 is hinged to allow access to the interior of housing 13. Wind turbine 16 may be removed from housing 13 by aligning propeller blade 18 with port 53 and moving generator 20 along service rail 22 until turbine 16 is altogether removed from housing 13.

Figure 3:
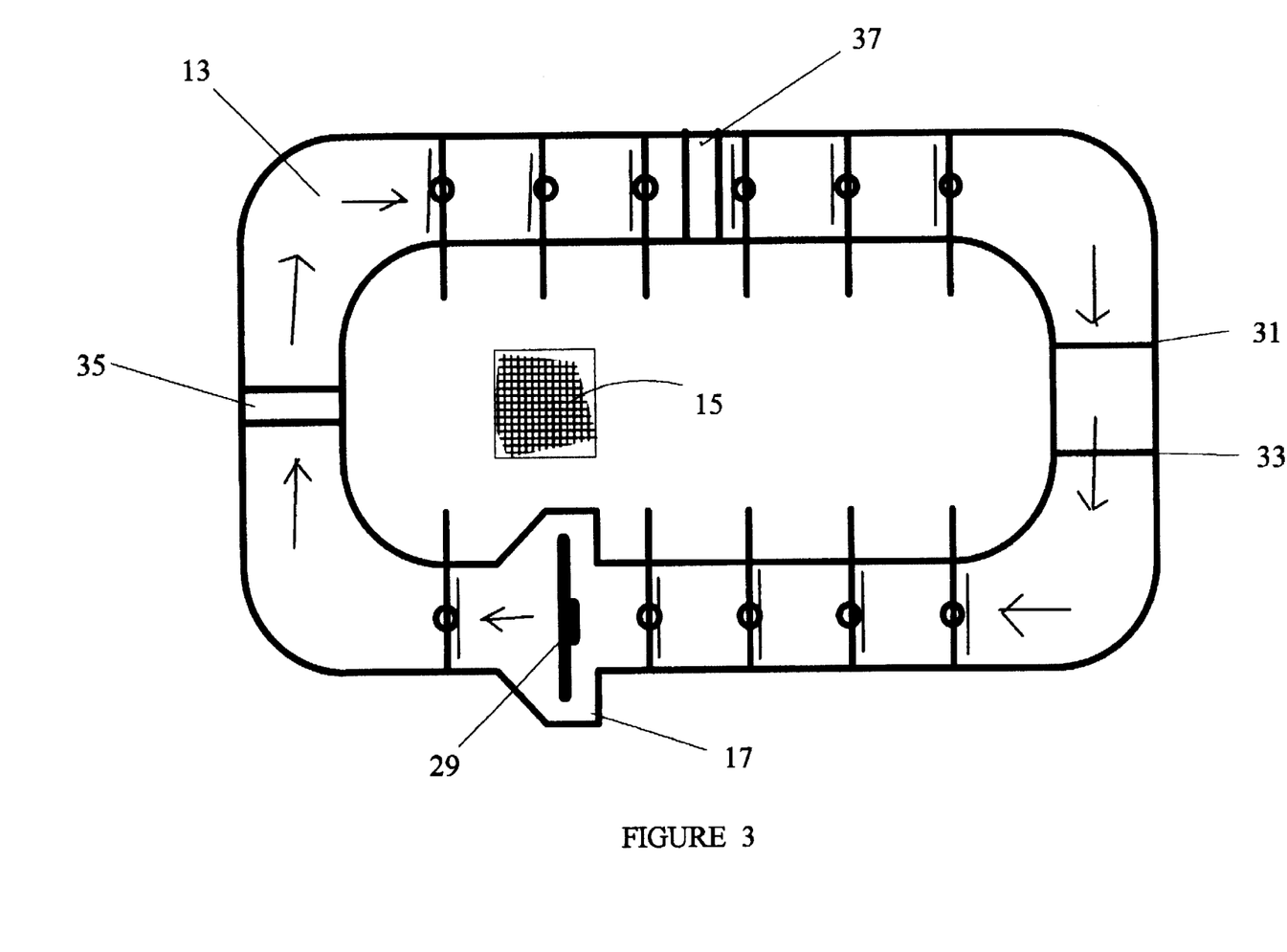
FIG. 3 is a schematic depiction of the forced recirculating air tunnel and cooperating internal components.

In the preferred embodiment of the present invention, the power consuming air propeller comprises a variable speed air propeller. The power generation apparatus of the present invention is depicted in schematic form in FIG. 3. As is shown in FIG. 3, the power consuming air propeller 29 is positioned substantially transverse to the airflow pathway defined by housing 13. As is shown, the power consuming air propeller receives electrical energy from the array of solar panels 15 (or an alternate energy source). The power consuming air propeller causes the continuous circulation of air within housing 13, preferably at a constant, monitored velocity. A variety of factors influence the velocity of the air which is circulated within housing 13. These factors include the speed of rotation of the power consuming air propeller 29, the temperature of the air within housing 13, the density of the air within housing 13, as well as the number and associated resistance of the plurality of wind turbines which are located within housing 13. In FIG. 3, the plurality of wind turbines are depicted schematically within housing 13. Additionally, a temperature control means 31 is provided in communication with the airflow pathway within housing 13, and may be utilized to heat or cool the air which is circulated therein. Additionally, a humidity control means 33 may be provided in communication with the airflow pathway defined within housing 13, which may be utilized to control the density of the air within housing 13. Venturi tubes 35 and airflow chokes 37 (which are also depicted schematically) may be also provided in communication with the airflow path within housing 13. All of these devices may be utilized in a coordinate manner to set and maintain a particular velocity for the air being circulated within housing 13.

Figure 4:
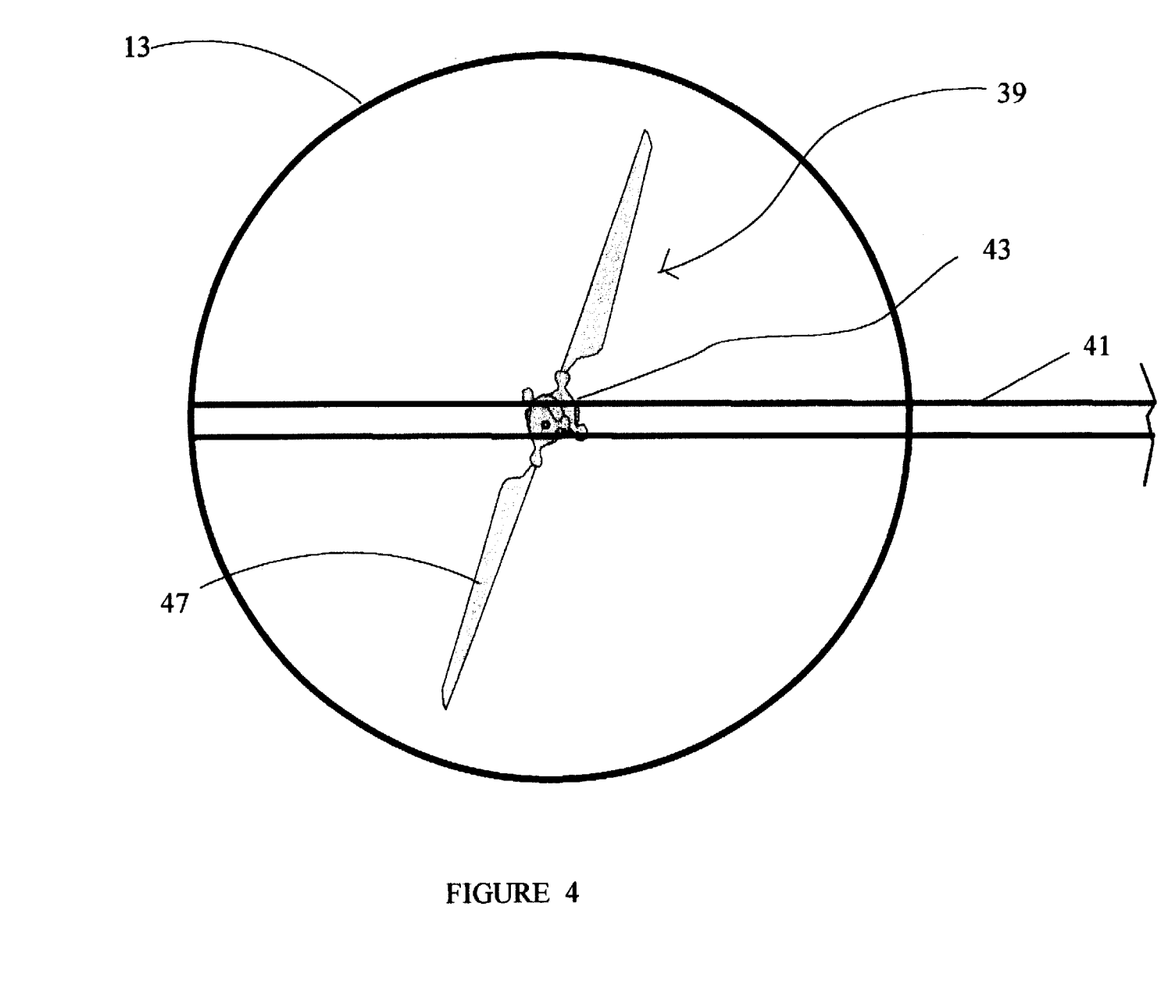
FIG. 4 is a cross-section view of the forced recirculating air tunnel which depicts one of the wind turbines and the frame utilized to suspend the wind turbine within the airflow pathway.
Figure 5:
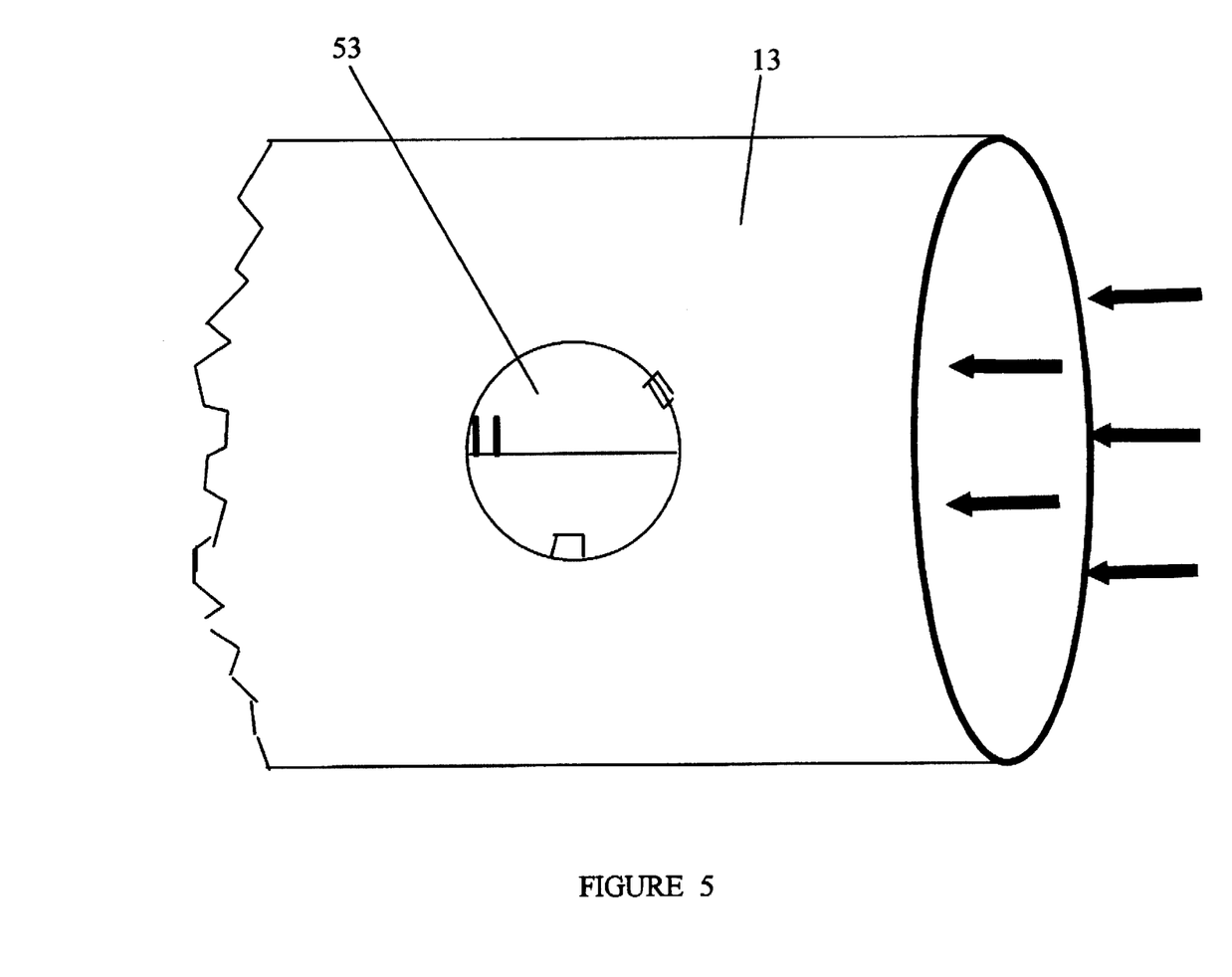
FIG. 5 is a fragmentary perspective view of an access port which allows for removal and servicing of a particular one of the plurality of wind turbines.

FIG. 4 is a cross-section view of housing 13. As is shown, turbine 39 is positioned substantially transverse to the airflow pathway defined therein. Turbine 39 includes a generator member 43 and a propeller member 47 which cooperate to generate electricity when propeller 47 is rotated relative to generator 43, in a manner which is conventional and well known. Service rail 41 locates turbine 39 within housing 13, and allows the turbine to be removed from housing 13 utilizing hinged port 53 of FIG. 5. As stated above, the apparatus 11 of the present invention may include dozens of the turbine assemblies within housing 13.

Figure 6A:
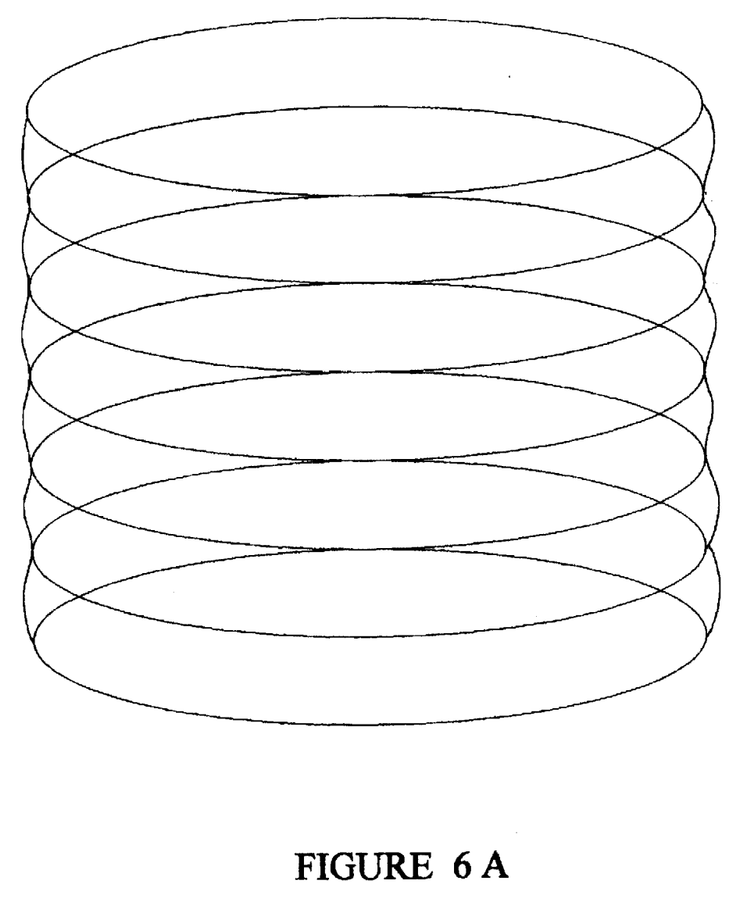
FIGS. 6A and 6B show alternative constructions for a helical airflow path versions of the present invention.
Figure 6B:
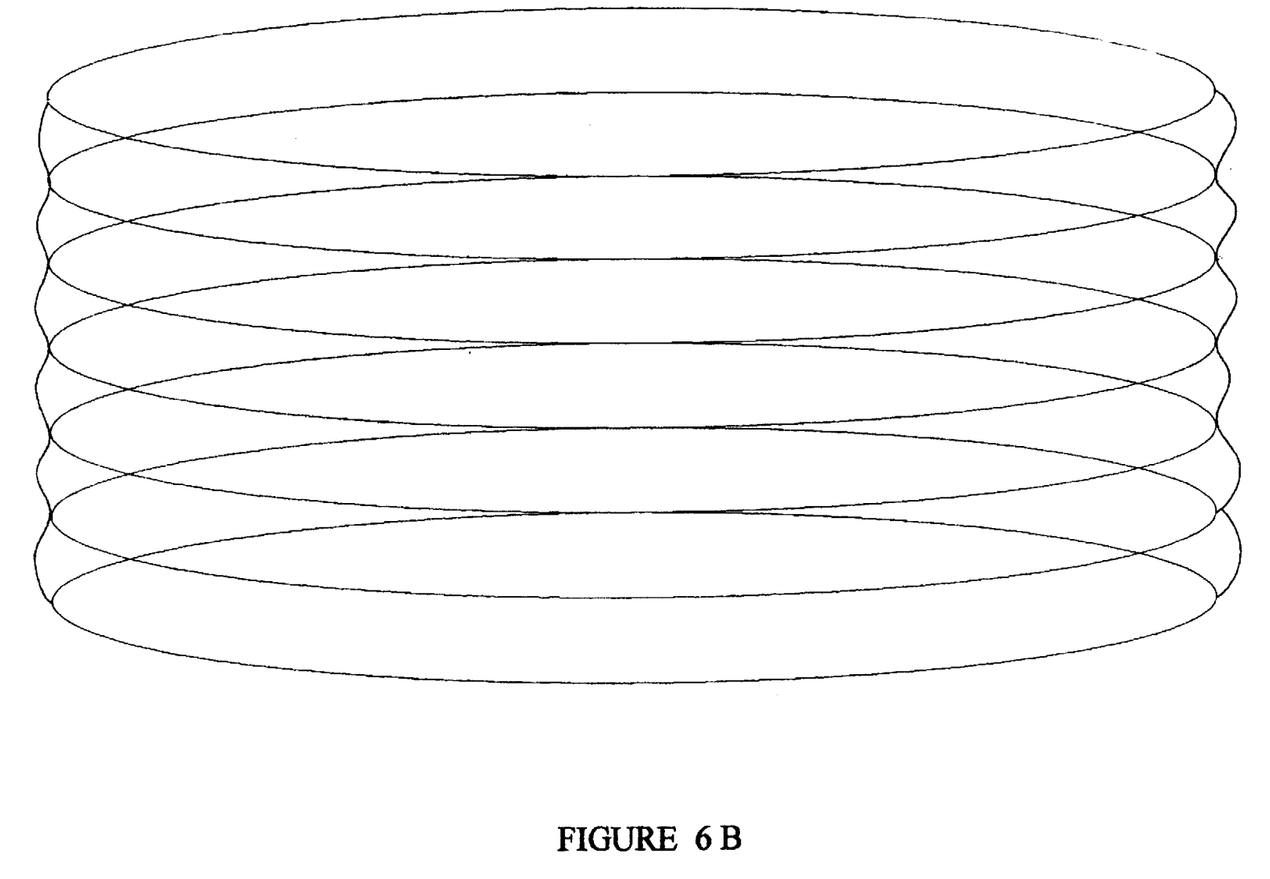

FIGS. 6A and 6B show two alternative configurations for housing 13 in accordance with the present invention. As is shown, a small diameter helical housing (of FIG. 6A) may be utilized to provide a significantly long air flow path in a relatively small area. In contrast, the helical construction of housing 13 may be utilized on a grand scale to provide significantly longer air flow paths (as is shown in FIG. 6B).

While the invention has been shown in only one of its forms, it is not thus limited but is susceptible to various changes and modifications without departing from the spirit thereof.

TABLE 1

RULE ONE

| WIND SPEED IN MPH | POWER OF THE WIND IS WIND SPEED CUBED | TIMES THE POWER OF A 6 MPH WIND | % OF INCREASE OVER A 6 MPH WIND (TIMES THE POWER OF WIND) | % MORE ENERGY WITH A 2 MPH INCREASE |
|---|---|---|---|---|
| 6 | 216 | 0.00 | 0% | 0 |
| 8 | 512 | 2.37 | 237% | 237% |
| 10 | 1000 | 4.63 | 463% | 195% |
| 12 | 1728 | 8.00 | 800% | 173% |
| 14 | 2744 | 12.70 | 1270% | 159% |
| 16 | 4096 | 18.96 | 1896% | 149% |
| 18 | 5832 | 27.00 | 2700% | 142% |
| 20 | 8000 | 37.04 | 3704% | 137% |
| 22 | 10648 | 49.30 | 4930% | 133% |
| 24 | 13824 | 64.00 | 6400% | 130% |
| 26 | 17576 | 81.37 | 8137% | 127% |
| 28 | 21952 | 101.63 | 10163% | 125% |
| 30 | 27000 | 125.00 | 12500% | 123% |
| 32 | 32768 | 151.70 | 15170% | 121% |
| 34 | 39304 | 181.96 | 18196% | 120% |
| 36 | 46656 | 216.00 | 21600% | 119% |
| 38 | 54872 | 254.04 | 25404% | 118% |
| 40 | 64000 | 296.30 | 29630% | 117% |
| 42 | 74088 | 343.00 | 34300% | 116% |
| 44 | 85184 | 394.37 | 39437% | 115% |
| 46 | 97336 | 450.63 | 45063% | 114% |
| 48 | 110592 | 512.00 | 51200% | 114% |
| 50 | 125000 | 578.70 | 57870% | 113% |
| 52 | 140608 | 650.96 | 65096% | 112% |
| 54 | 157464 | 729.00 | 72900% | 112% |
| 56 | 175616 | 813.04 | 81304% | 112% |
| 58 | 195112 | 903.30 | 90330% | 111% |
| 60 | 216000 | 1000.00 | 100000% | 111% |
| 62 | 238328 | 1103.37 | 110337% | 110% |
| 64 | 262144 | 1213.63 | 121363% | 110% |
| 66 | 287496 | 1331.00 | 133100% | 110% |
| 68 | 314432 | 1455.70 | 145570% | 109% |
| 70 | 343000 | 1587.96 | 158796% | 109% |
| 72 | 373248 | 1728.00 | 172800% | 109% |

TABLE 2

| PROPELLER DIAMETER (FT.) DOUBLED | POWER OBTAINED (% OF INCREASE) |
|---|---|
| 2 | 8 |
| 4 | 16 |
| 8 | 32 |
| 16 | 64 |
| 32 | 128 |
| 64 | 256 |
| 128 | 512 |

What is claimed is:

1. An apparatus for generating electricity, comprising:
    a housing defining a substantially enclosed and continuous, closed-loop airflow pathway with no substantial communication with ambient winds outside said housing;
    at least one power consuming air propeller for propelling air within said substantially enclosed and continuous, closed-loop airflow pathway;
    means for energizing said at least one power consuming air propeller;
    a plurality of wind turbines located in said substantially enclosed and continuous, closed-loop airflow pathway, each including at least one propeller blade for engaging airflow within said substantially enclosed and continuous, closed-loop airflow pathway and each including a generator member for generating electricity in response to rotation of said at least one propeller blade.

2. An apparatus for generating electricity according to claim 1, wherein said housing defines an enclosed, continuous, and sealed closed-loop airflow pathway.

3. An apparatus for generating electricity according to claim 1 wherein said airflow pathway defines a particular one of the following closed-loop shapes:
    (a) a circular closed-loop shape;
    (b) an oval closed-loop shape;
    (c) a rectangular closed-loop shape;
    (d) an elliptical closed-loop shape; and
    (e) a spiral closed loop shape.

4. An apparatus for generating electricity according to claim 1, wherein said at least one power consuming air propeller comprises a variable speed air propeller.

5. An apparatus for generating electricity according to claim 4 wherein said variable speed air propeller is positioned inline within said substantially enclosed and continuous airflow pathway.

6. An apparatus for generating electricity according to claim 1 wherein said at least one power consuming air propeller operates simultaneously to push air and to pull air within said substantially enclosed and continuous closed-loop airflow pathway.

7. An apparatus for generating electricity according to claim 1 wherein said at least one power consuming air propeller is utilized to maintain a particular velocity of airflow within said substantially enclosed and continuous closed-loop airflow pathway.

8. An apparatus for generating electricity according to claim 7, wherein said particular velocity is obtained at a particular air temperature by maintaining a particular propeller speed for said at least one power consuming air propeller.

9. An apparatus for generating electricity according to claim 7, further including at least one of the following:
    (a) at least one venturi tube communicating with said, substantially enclosed and continuous, closed-loop airflow pathway;
    (b) at least one reduced diameter portion of said substantially enclosed and continuous, closed-loop airflow pathway;
    (c) means for controlling air density within said substantially enclosed and continuous, closed-loop airflow pathway; and
    (d) means for controlling air humidity within said substantially enclosed and continuous, closed-loop airflow pathway;
    which can be utilized to maintain said particular velocity.

10. An apparatus for generating electricity according to claim 1, wherein said means for energizing comprises at least one electric motor.

11. An apparatus for generating electricity according to claim 1, wherein said means for energizing comprises at least one solar powered electrical motor.

12. An apparatus for generating electricity according to claim 11, wherein said means for energizing further includes at least one of the following:
    (a) an electric motor; and
    (b) an internal combustion engine.

13. An apparatus for generating electricity according to claim 1, wherein said at least one propeller blade of each of said plurality of wind turbines is located entirely within said substantially enclosed and continuous, closed-loop airflow pathway.

14. An apparatus for generating electricity according to claim 13, wherein said at least one propeller blade of each of said plurality of wind turbines is positioned transverse to said airflow pathway.

15. An apparatus for generating electricity according to claim 1, further including:
at least one maintenance porthole which allows removal of at least a particular one of said plurality of wind turbines for repair.

16. A method of generating electricity, comprising the method steps of:
providing a housing defining a substantially enclosed and continuous, closed-loop airflow pathway which has no substantial communication with ambient wind outside said housing;
locating at least one power consuming air propeller therein for propelling air within said substantially enclosed and continuous, closed-loop airflow pathway;
energizing at least one power consuming air propeller to cause air to flow about said enclosed and continuous, closed-loop airflow pathway;
locating a plurality of wind turbines in said substantially enclosed and continuous closed-loop airflow pathway, each including at least one propeller blade for engaging airflow within said substantially enclosed and continuous closed-loop airflow pathway and each including a generator member of generating electricity in response to rotation of said at least one propeller blade; and
utilizing said plurality of wind turbines to generate electricity.

17. A method of generating electricity according to claim 16 wherein said at least one power consuming air propeller operates simultaneously to push air and to pull air within said substantially enclosed and continuous, closed-loop airflow pathway.

18. A method of generating electricity according to claim 16 wherein said at least one power consuming air propeller is utilized to maintain a particular velocity of airflow within said substantially enclosed and continuous, closed-loop airflow pathway.

19. A method of generating electricity according to claim 18, wherein said particular velocity is obtained at a particular air temperature by maintaining a particular propeller speed for said at least one power consuming air propeller.

20. A method of generating electricity according to claim 7, further including at least one of the following:
(a) at least one venturi tube communicating with said, substantially enclosed and continuous, closed-loop airflow pathway;
(b) at least one reduced diameter portion of said substantially enclosed and continuous, closed-loop airflow pathway;
(c) means for controlling air density within said substantially enclosed and continuous, closed-loop airflow pathway; and
(d) means for controlling air humidity within said substantially enclosed and continuous, closed-loop airflow pathway;
which can be utilized to maintain said particular velocity.

21. A method of generating electricity according to claim 16, wherein said at least one propeller blade of each of said plurality of wind turbines is located entirely within said substantially enclosed and continuous, closed-loop airflow pathway.

22. A method of generating electricity according to claim 21, wherein said at least one propeller blade of each of said plurality of wind turbines is positioned transverse to said airflow pathway.

* * * * *